US011184333B2

(12) United States Patent
McDougal (10) Patent No.: US 11,184,333 B2
(45) Date of Patent: Nov. 23, 2021

(54) HUMAN CAPITAL MANAGEMENT DATA TRANSFER SYSTEMS (71) Applicant: Intecrowd LLC, Orlando, FL (US)

(72) Inventor: Don McDougal, Lake Worth, FL (US)

(73) Assignee: Intecrowd, LLC, Orlando, FL (US)

( * ) Notice: Subject to any disclaimer, the term of this patent is extended or adjusted under 35 U.S.C. 154(b) by 0 days.

(21) Appl. No.: 16/466,749

(22) PCT Filed: Dec. 4, 2017

(86) PCT No.: PCT/US2017/064494
§ 371 (c)(1),
(2) Date: Jun. 5, 2019

(87) PCT Pub. No.: WO2018/106590
PCT Pub. Date: Jun. 14, 2018

(65) Prior Publication Data
US 2019/0349339 A1 Nov. 14, 2019

Related U.S. Application Data (60) Provisional application No. 62/430,239, filed on Dec. 5, 2016.

(51) Int. Cl.
H04L 29/06 (2006.01)
(52) U.S. Cl.
CPC .............. H04L 63/0428 (2013.01)
(58) Field of Classification Search
None
See application file for complete search history.

(56) References Cited

U.S. PATENT DOCUMENTS

| 8,806,607 | B2 | 8/2014 | Archer et al. |
| 9,608,810 | B1* | 3/2017 | Ghetti ............... H04L 63/102 |
| 10,284,557 | B1* | 5/2019 | Nossik ............... H04L 63/0218 |
| 2004/0034659 | A1 | 2/2004 | Steger |
| 2005/0149746 | A1* | 7/2005 | Lu ............................ H04L 63/20 713/191 |
| 2007/0028305 | A1 | 2/2007 | Chen |

(Continued)

FOREIGN PATENT DOCUMENTS

KR 20020093188 A 12/2002

OTHER PUBLICATIONS

International Search Report and Written Opinion for PCT Application No. PCT/US2017/064494, dated Mar. 21, 2018.

*Primary Examiner* — Michael Pyzocha
(74) *Attorney, Agent, or Firm* — Locke Lord LLP; Daniel J. Fiorello (57) ABSTRACT A computer implemented method for securely extracting secure data from a human capital management (HCM) system, includes receiving setup data from a production tenant of the HCM system, wherein the setup data includes one or more field types describing what type of secure data is stored on the production tenant, creating a scrambling module based on the setup data that is configured to scramble the secure data based on scrambling settings, wherein the scrambling module is configured to upload and install onto the HCM system and to communicate with the production tenant to receive the secure data to scramble the secure data, and uploading the scrambling module to the HCM system.

11 Claims, 3 Drawing Sheets (56) References Cited

U.S. PATENT DOCUMENTS

| | | | |
|---|---|---|---|
| 2010/0031023 A1* | 2/2010 | Dodd | H04L 63/0428 |
| | | | 713/155 |
| 2012/0005486 A1* | 1/2012 | Watanabe | G06F 21/6245 |
| | | | 713/193 |
| 2014/0172806 A1* | 6/2014 | Wilding | G06F 16/24 |
| | | | 707/693 |
| 2014/0358606 A1 | 12/2014 | Hull | |
| 2015/0081873 A1* | 3/2015 | Stein | G06Q 10/067 |
| | | | 709/223 |
| 2015/0113659 A1* | 4/2015 | D'Costa | G06F 21/6254 |
| | | | 726/26 |
| 2015/0347120 A1* | 12/2015 | Garg | G06F 8/65 |
| | | | 709/223 |
| 2017/0004323 A1* | 1/2017 | Balachandran | G06F 16/13 |
| 2017/0104639 A1* | 4/2017 | Jiang | H04L 69/22 |
| 2017/0244713 A1* | 8/2017 | Sun | H04L 63/0281 |
| 2018/0285576 A1* | 10/2018 | Cannings | G10L 19/0018 |

\* cited by examiner

HUMAN CAPITAL MANAGEMENT DATA TRANSFER SYSTEMS

CROSS REFERENCE TO RELATED APPLICATIONS

This application is the U.S. National Stage of PCT International Application No. PCT/US2017/064494, filed Dec. 4, 2017 which claims the benefit of U.S. Provisional Application No. 62/430,239 filed Dec. 5, 2016, the entire disclosures of which are hereby incorporated herein by reference in their entirety.

BACKGROUND

1. Field

The present disclosure relates to hardware and software systems for human capital management (HCM), more specifically to data transference systems for HCM.

2. Description of Related Art

Enterprise software as a service (SaaS) customers using products like Workday, Employee Central, Oracle Fusion, Ultimate, NetSuite, for example, regularly refresh their supporting tenants such as Test, Development, Training, and Sandbox environments, with a copy of the company's production tenant data. Production data includes current actual employee related data values as well as historical data values. Significant portions of this data are considered Personally Identifiable Information (PII), e.g., data considered to be sensitive by law requiring a higher level of protection or specified data handling procedures) under various legislative mandates within and outside the United States of America. Other certain values, though not PII by legal definition, are sometimes considered organizationally sensitive and should not be accessible to other employees or support organizations (e.g., such as IT outsourcing partners) as a matter of best practice.

There are concerns about over exposure of sensitive data outside of a production tenant. HCM Software customers have several tenants used for different purposes including, production (live system), test, training, development, implementation, etc. Methods of minimizing exposure include scrambling or masking sensitive data values that are stored in the production tenant. However existing methods are manual, complex, time consuming, and expensive which discourages all but a small handful of organizations from pursuing these options. Also, the current available methods require exporting PII from a HCM master tenant (a production tenant) to perform scrambling manually or with 3rd party tools, and then manually uploading the scrambled data into the HCM target tenant. Exporting PII from an HCM tenant exposes sensitive data to further transport and manipulation, adding inherent risk of data breaches to the manual approach to scrambling PII in HCM.

Additionally, manual methods of accomplishing data scrambling in HCM Software can take weeks to accomplish. Most companies do not scramble data in non-production HCM tenants, because it is too costly and time consuming. Another related problem to data scrambling in HCM tenants, is the current process of creating a new HCM tenant from blank tenant (a tenant with no configuration, setup, structure or data in it). This process can take many days or weeks to accomplish.

Such conventional methods and systems have generally been considered satisfactory for their intended purpose. However, there is still a need in the art for improved HCM systems. The present disclosure provides a solution for this need.

SUMMARY

A computer implemented method for securely extracting secure data from a human capital management (HCM) system, includes receiving setup data from a production tenant of the HCM system, wherein the setup data includes one or more field types describing what type of secure data is stored on the production tenant, creating a scrambling module based on the setup data that is configured to scramble the secure data based on scrambling settings, wherein the scrambling module is configured to upload and install onto the HCM system and to communicate with the production tenant to receive the secure data to scramble the secure data, and uploading the scrambling module to the HCM system.

Creating the scrambling module can include creating a self-delete protocol configured to delete the scrambling module after scrambling the secure data has been completed. The scrambling module can be further configured to communicate with a support tenant to send scrambled data to the support tenant.

Uploading the scrambling module can include installing the scrambling module onto a support tenant. Uploading the scrambling module can include installing the scrambling module onto the production tenant.

The method can include transmitting a request to receive setup data to the production tenant before receiving the setup data. In certain embodiments, the method can include generating a form for a user to select which field types of the setup data are to be scrambled and/or one or more scrambling techniques for how the field types are to be scrambled.

Generating the form can include generating a user selection to allow encryption of one or more scrambling techniques. The method can include creating a user profile to store preferences and/or for scheduling for uploading and/or executing the scrambler module.

In accordance with at least one aspect of this disclosure, a non-transitory computer readable medium can include computer executable instructions for executing a computer implemented method of any embodiments and/or combinations thereof as described herein.

In accordance with at least one aspect of this disclosure, an apparatus can include a non-transitory computer readable medium including computer executable instructions for executing a computer implemented method of any embodiments and/or combinations thereof as described herein. The apparatus also includes a processor configured to execute the computer executable instructions stored on the non-transitory computer readable medium, one or more receiving modules for receiving setup data from the production tenant of the HCM system, and one or more transmitting modules for uploading the scrambler module to the HCM system.

In accordance with at least one aspect of this disclosure, a system can include a production tenant which stores secure data, a support tenant, and an apparatus, e.g., as described above operatively connected to the production tenant to receive setup data from the production tenant. The apparatus can be operatively connected to a storage medium of the HCM system to upload the scrambling module to the HCM system.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
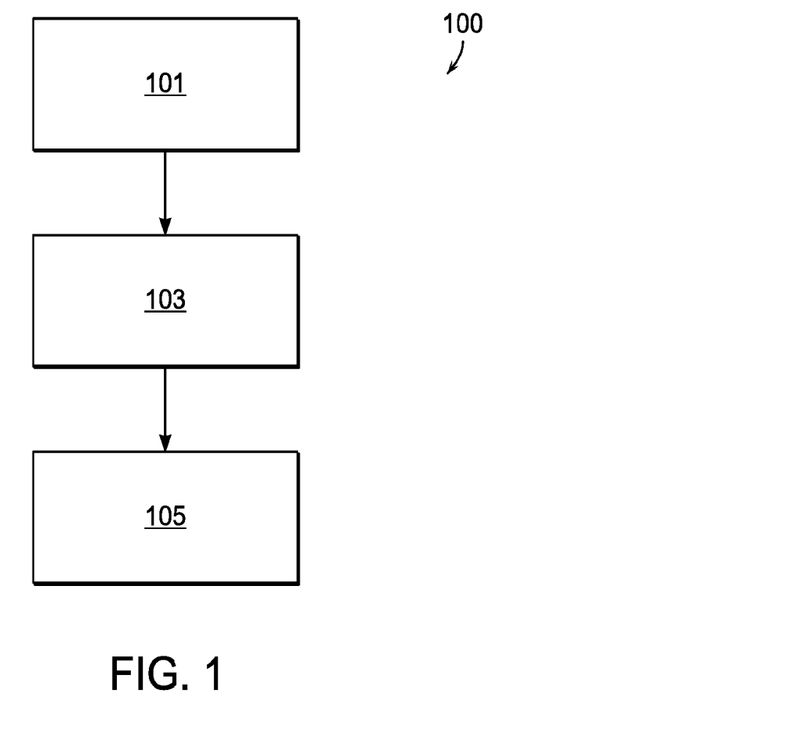
FIG. 1 is a flow diagram of an embodiment of a method in accordance with this disclosure.
Figure 2:
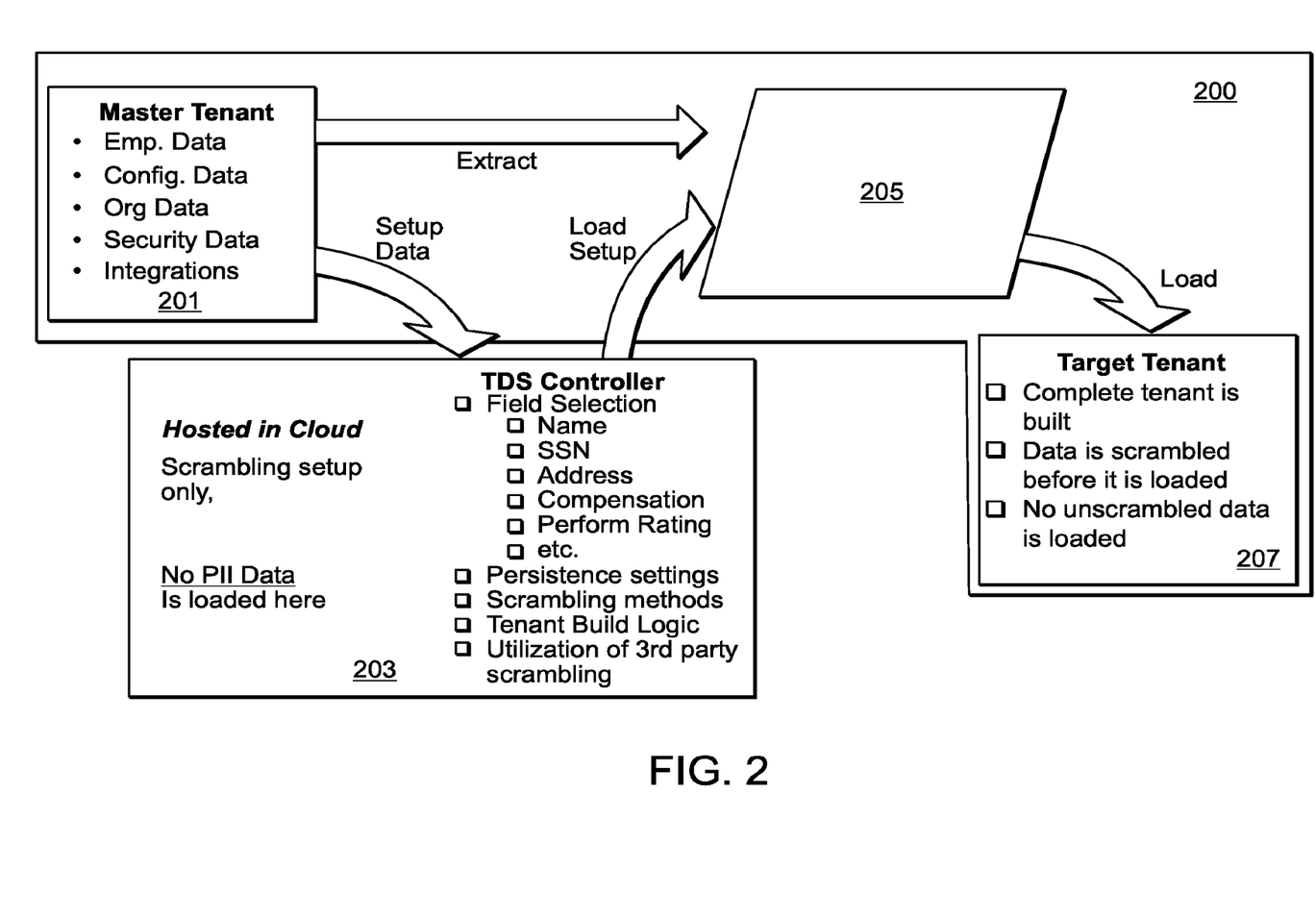
FIG. 2 is a schematic view of an embodiment of a system in accordance with this disclosure.
Figure 3:
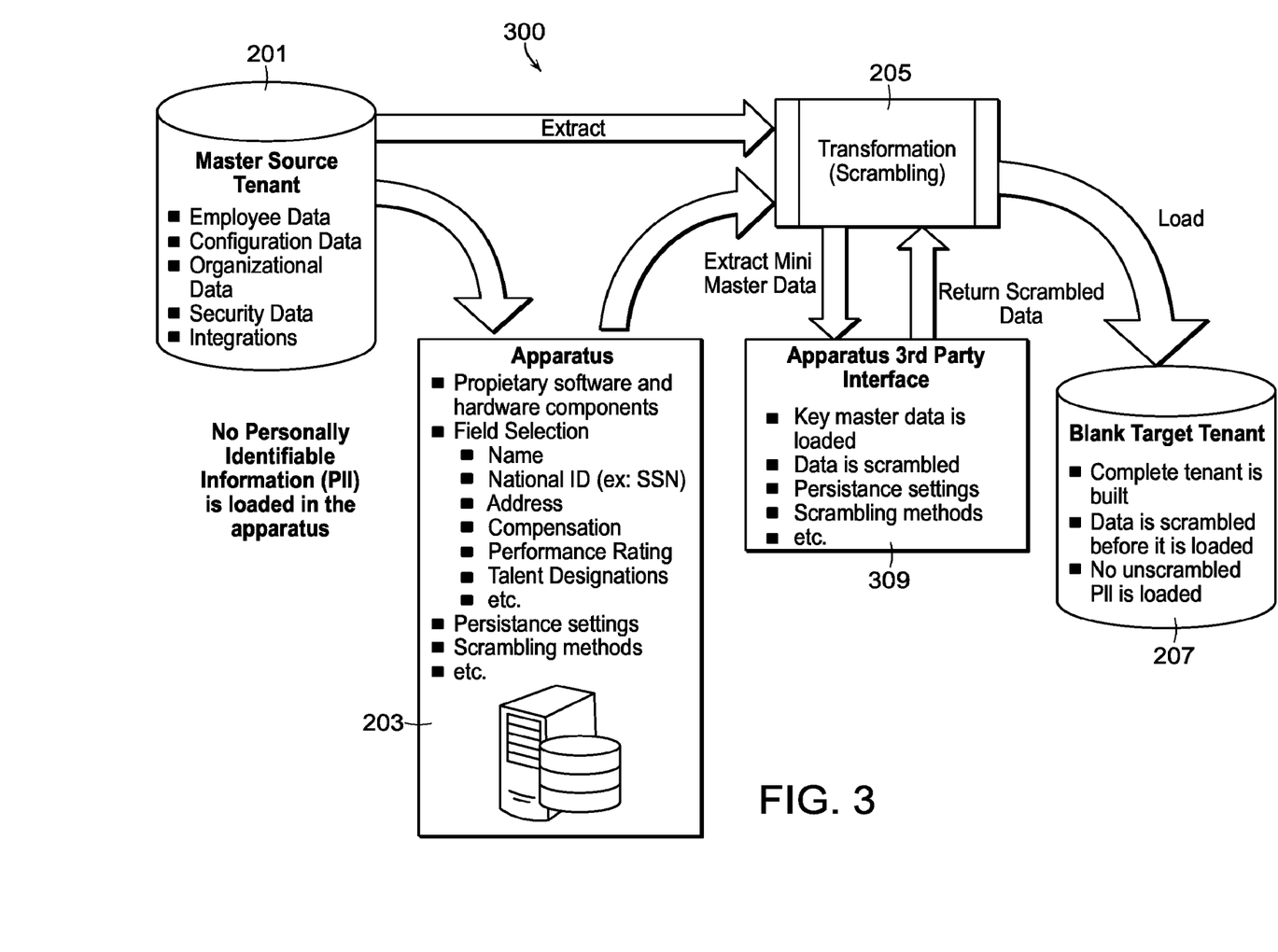
FIG. 3 is a schematic view of another embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2 and 3. The systems and methods described herein can be used to improve HCM systems and data transfer, for example.

Referring to FIGS. 1 and 2, a computer implemented method 100 for securely extracting secure data from a human capital management (HCM) system 200 includes receiving (e.g., at block 101) setup data from a production tenant 201 (e.g., a master tenant) of the HCM system 200. The setup data includes one or more field types describing what type of secure data is stored on the production tenant 201. The setup data can include metadata and/or any suitable configuration data to determine what type of data is stored on the production tenant 201.

The setup data can be received at an apparatus 203 that is outside the architecture of system 200. It is contemplated that the apparatus 203 can include any suitable hardware and/or software, and can be hosted in a cloud computing environment or in any other suitable manner. In certain embodiments, the apparatus 203 can be hosted within the HCM system 200.

The method 100 also include creating (e.g., at block 103) a scrambling module 205 based on the setup data. The scrambling module 205 is configured to scramble the secure data based on scrambling settings. The scrambling module 205 is configured to upload and install onto the HCM system 200 and to communicate with the production tenant 201 to receive the secure data to scramble the secure data.

The method 100 also includes uploading (e.g., at block 105) the scrambling module 205 to the HCM system 200. Uploading and/or installation can be performed in any suitable manner.

Creating the scrambling module 205 can include creating a self-delete protocol configured to delete the scrambling module 205 after scrambling the secure data has been completed. In this regard the scrambling module 205 can be a temporary scrambler. The scrambling module 205 can be further configured to communicate with a support tenant 207 (e.g., a target tenant) to send scrambled data to the support tenant 207. Any other suitable connections are contemplated herein.

Uploading the scrambling module 205 can include installing the scrambling module 205 onto a support tenant 207. Uploading the scrambling module 205 can include installing the scrambling module 205 onto the production tenant 201. It is contemplated that the scrambling module 205 and/or any suitable software code and/or any other suitable portion thereof can be installed on any suitable storage mediums and/or combinations thereof of the HCM system 200.

The method 100 can include transmitting a request to receive setup data to the production tenant 201 before receiving the setup data. In certain embodiments, the method 100 can include generating a form for a user to select which field types of the setup data are to be scrambled and/or one or more scrambling techniques for how the field types are to be scrambled. Any suitable number and/or type of scrambling techniques can be used.

Generating the form can include generating a user selection to allow encryption of one or more scrambling techniques to hide the one or more scrambling techniques (e.g., from a user of the support tenant 207 so that the data cannot be descrambled). The method 100 can include creating a user profile to store preferences and/or for scheduling for uploading and/or executing the scrambler module 205.

Referring to FIG. 3, another embodiment of a system 300 can include a 3rd party interface 309 in operative communication with the scrambling module 309 to allow extraction of the secure data, third party scrambling, and uploading of the scrambled data to the scrambling module 207. In this regard, the scrambling can be performed by a third party, then the scrambling module 205 can send the scrambled data to the support tenant 207 (and then the scrambling module 205 can delete itself in certain embodiments).

In accordance with at least one aspect of this disclosure, a non-transitory computer readable medium can include computer executable instructions for executing a computer implemented method of any embodiments and/or combinations thereof as described herein.

In accordance with at least one aspect of this disclosure, an apparatus can include a non-transitory computer readable medium including computer executable instructions for executing a computer implemented method of any embodiments and/or combinations thereof as described herein. The apparatus also includes a processor configured to execute the computer executable instructions stored on the non-transitory computer readable medium, one or more receiving modules for receiving setup data from the production tenant of the HCM system, and one or more transmitting modules for uploading the scrambler module to the HCM system.

In accordance with at least one aspect of this disclosure, a system can include a production tenant which stores secure data, a support tenant, and an apparatus, e.g., as described above operatively connected to the production tenant to receive setup data from the production tenant. The apparatus can be operatively connected to a storage medium of the HCM system to upload the scrambling module to the HCM system.

The process can begin with the designation of a production tenant 201 from which to extract data. The data in this tenant can contain all original attributes and is the correct and unscrambled information. In the apparatus 205, the fields from the master tenant 201 which should be scrambled and the method of scrambling are designated. The apparatus 205 communicates with the data from the master tenant 201, utilizing the scrambling selections, and creates a series of scrambled data files which are then loaded in the target tenant 207 in the appropriate sequence, e.g., along with the foundational tenant set up data.

FIG. 3 outlines the use of the apparatus in its secondary deployment approach which allows an interface to communicate to and from a third party plug in application to complete one piece of the process at the client's discretion while the apparatus maintains control of the selection, extraction, and load processes.

This invention allows management and protection of personally identifiable information through the automation of scrambling designated data values considered to be personal or private under various locale's legislation in Human Capital Management (HCM) software application(s). The invention also allows the automated build and preparation of additional HCM tenants or instances.

As described above, setup information is accessed by the apparatus 203 to enable the apparatus operator to select the fields to scramble. Employee data and other secure data (e.g., PII) does not leave the HCM SaaS Secure Server Environment. The person operating the apparatus does not see or need to see sensitive information. Additionally, the operator can specify the scrambling method to be used, e.g., including persistence, and can initiate a scrambling event. Since no secure data leaves the HCM cloud architecture while using apparatus addresses the data security risk introduced when data is extracted to an external computer for manual scrambling. Embodiments thus allow scrambling data on-the-fly, without exporting the data from HCM secure servers.

Embodiments as described above can automatically scramble PII and other sensitive data values so the data value cannot be attributed to its original owner. This scrambling occurs without leaving HCM SaaS servers, thus keeping data secure during the scrambling process.

Embodiments also allow automatic preparation (building) a HCM SaaS tenant automatically with the required configuration and system settings to produce a fully functional HCM System. This can be done by accessing hundreds of specific HCM SaaS vendor Public Web Services in prescribed sequences both to extract and to load in and to HCM SaaS Tenants.

Embodiments can automatically extract and load selected scrambled data and remaining unscrambled data in the appropriate sequential order to a designated target HCM tenant to either update an existing tenant with scrambled data, and/or create a new functional HCM Tenant with scrambled data.

Embodiments can allow the insertion of a third party application into the apparatus and processes to conduct a portion of the scrambling processing with a specific 3rd party available scrambling methodology. This can require a secure integration with the third party application to allow the customer to scramble the data and then send to back to HCM via secure integration in the new scrambled state.

In certain embodiments, apparatus actions can be initiated by user (e.g., customers) selections of scrambling methods. For example, users can use the apparatus to select the fields they want to scramble, select certain modules, select specific parts of the organization, select specific scrambling methods or algorithms to be used, etc. Users can also schedule scrambling events to run at convenient times, for example.

Embodiments can allow the functionality of the apparatus 205 to be managed and monitored through a mobile device or any other suitable computing device (e.g., due to possible existence on the cloud).

Embodiments accomplish scrambling events and tenant builds in an automated fashion requiring very little manual effort. Embodiments provide an automated solution for scrambling selected data in non-production HCM tenants and provide an automated method of building and populating a new HCM tenant with data without exporting the data from the HCM Provider's servers.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Embodiments can be configured to let a user select which data fields should be scrambled and on what frequency, select the scrambling option by field, establish business rules, parameters, and valid data ranges, select from two directional approaches to data scrambling, deterministic data obfuscation such that the same scrambled value persists each time the data is scrambled (e.g. same masked SSN), and dynamic data obfuscation such that data is scrambled differently each time, for example. Embodiments also maintain data privacy in non-production tenants, maintain data security in non-production tenants accomplish scrambling without the data leaving the HCM Provider's secure server environment, better protect PII in transformation as it remains in a secure environment during the transformation process, establish valid data ranges to assure business processes execute properly, and utilize a compatible third party data scrambling tool with the machine, for example.

The methods and systems of the present disclosure, as described above and shown in the drawings, provide for HCM systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A computer implemented method for securely extracting secure data from a human capital management (HCM) system, comprising:
   receiving setup data from a production tenant of the HCM system, wherein the setup data includes one or more field types describing what type of secure data is stored on the production tenant;
   creating a scrambling module based on the setup data that is configured to scramble the secure data based on scrambling settings, wherein the scrambling settings include a persistence scrambling setting to cause the scrambling module to:
      scramble each instance of secure data to produce a unique scrambled value for each instance of secure data; and
      reproduce the same unique scrambled value from the same instance of secure data each time the secure data is scrambled such that each scrambled value persists, wherein the scrambling module is configured to upload and install onto the HCM system and to communicate with the production tenant to receive the secure data to scramble the secure data; and
   uploading the scrambling module to the HCM system, wherein creating the scrambling module includes creating a self-delete protocol configured to delete the scrambling module after scrambling the secure data has been completed and wherein the scrambling is performed by a third party.

2. The method of claim 1, wherein the scrambling module is further configured to communicate with a support tenant to send scrambled data to the support tenant.

3. The method of claim 1, wherein uploading the scrambling module includes installing the scrambling module onto a support tenant.

4. The method of claim 1, wherein uploading the scrambling module includes installing the scrambling module onto the production tenant.

5. The method of claim 1, further comprising transmitting a request to receive setup data to the production tenant before receiving the setup data.

6. The method of claim 1, further comprising generating a form for a user to select which field types of the setup data are to be scrambled and/or one or more scrambling techniques for how the field types are to be scrambled.

7. The method of claim 6, wherein the generating the form can include generating a user selection to allow encryption of one or more scrambling techniques to hide the one or more scrambling techniques.

8. The method of claim 7, further comprising creating a user profile to store preferences and/or for scheduling for uploading and/or executing the scrambler module.

9. A non-transitory computer readable medium comprising computer executable instructions for executing a computer implemented method, the method comprising:
   receiving setup data from a production tenant of the HCM system, wherein the setup data includes one or more field types describing what type of secure data is stored on the production tenant:
   creating a scrambling module based on the setup data that is configured to scramble the secure data based on scrambling settings, wherein the scrambling settings include a persistence scrambling setting to cause the scrambling module to:
      scramble each instance of secure data to produce a unique scrambled value for each instance of secure data; and
      reproduce the same unique scrambled value from the same instance of secure data each time the secure data is scrambled such that each scrambled value persists, wherein the scrambling module is configured to upload and install onto the HCM system and to communicate with the production tenant to receive the secure data to scramble the secure data; and uploading the scrambling module to the HCM system, wherein creating the scrambling module includes creating a self-delete protocol configured to delete the scrambling module after scrambling the secure data has been completed and wherein the scrambling is performed by a third party.

10. An apparatus, comprising:

a non-transitory computer readable medium including computer executable instructions for executing a computer implemented method, wherein the method includes:

receiving setup data from a production tenant of the HCM system, wherein the setup data includes one or more field types describing what type of secure data is stored on the production tenant;

creating a scrambling module based on the setup data that is configured to scramble the secure data based on scrambling settings, wherein the scrambling settings include a persistence scrambling setting to cause the scrambling module to:

scramble each instance of secure data to produce a unique scrambled value fo each instance of secure data; and reproduce the same unique scrambled value from the same instance of secure data each time the secure data is scrambled such that each scrambled value persists, wherein the scrambling module is configured to upload and install onto the HCM system and to communicate with the production tenant to receive the secure data to scramble the secure data; and uploading the scrambling module to the HCM system, wherein creating the scrambling module includes creating a self-delete protocol configured to delete the scrambling module after scrambling the secure data has been completed and wherein the scrambling is performed by a third party;

a processor configured to execute the computer executable instructions stored on the non-transitory computer readable medium;

one or more receiving module for receiving setup data from the production tenant of the HCM system; and one or more transmitting modules for uploading the scrambler module to the HCM system.

11. A system, comprising:

a production tenant which stores secure data;

a support tenant;

an apparatus of claim 10 operatively connected to the production tenant to receive setup data from the production tenant, wherein the apparatus is operatively connected to a storage medium of the HCM system to upload the scrambling module to the HCM system.

* * * * *

UNITED STATES PATENT AND TRADEMARK OFFICE
CERTIFICATE OF CORRECTION

| | | |
|---|---|---|
| PATENT NO. | : 11,184,333 B2 | Page 1 of 1 |
| APPLICATION NO. | : 16/466749 | |
| DATED | : November 23, 2021 | |
| INVENTOR(S) | : Don McDougal et al. | |

It is certified that error appears in the above-identified patent and that said Letters Patent is hereby corrected as shown below:

On the Title Page

Item (12) delete "McDougal" and insert -- McDougal et al. --

Item (72) Inventor is corrected to read:
Don McDougal, Lake Worth, FL (US)
Robert C. E. Polocz Jr., Orlando FL (US)

Signed and Sealed this
Thirty-first Day of December, 2024

Derrick Brent
*Acting Director of the United States Patent and Trademark Office*